United States Patent
Luukkainen et al.

(10) Patent No.: US 12,360,670 B2
(45) Date of Patent: Jul. 15, 2025

(54) APPARATUS AND METHOD TO SHARE HOST SYSTEM RAM WITH MASS STORAGE MEMORY RAM

(71) Applicant: Memory Technologies LLC, Kirkland, WA (US)

(72) Inventors: Olli Luukkainen, Salo (FI); Kimmo J. Mylly, Ylojarvi (FI); Jani Hyvonen, Tampere (FI)

(73) Assignee: Memory Technologies LLC, Kirkland, WA (US)

( * ) Notice: Subject to any disclaimer, the term of this patent is extended or adjusted under 35 U.S.C. 154(b) by 0 days.

(21) Appl. No.: 18/351,408

(22) Filed: Jul. 12, 2023

(65) Prior Publication Data

US 2024/0020008 A1    Jan. 18, 2024

Related U.S. Application Data

(63) Continuation of application No. 17/937,901, filed on Oct. 4, 2022, now Pat. No. 11,733,869, which is a (Continued)

(51) Int. Cl.
   *G06F 3/06* (2006.01)
   *G06F 12/02* (2006.01)
   *G06F 12/06* (2006.01)

(52) U.S. Cl.
   CPC ............ *G06F 3/061* (2013.01); *G06F 3/0631* (2013.01); *G06F 3/0655* (2013.01);
   (Continued)

(58) Field of Classification Search
   CPC ............ G06F 12/0223; G06F 12/0246; G06F 12/0638; G06F 2212/171; G06F 2212/205;
   (Continued)

(56) References Cited

U.S. PATENT DOCUMENTS 5,394,535 A    2/1995  Ohuchi
5,586,291 A   12/1996  Lasker et al.
(Continued)

FOREIGN PATENT DOCUMENTS

AU    2005200855    9/2004
CN       1517886    8/2004
(Continued)

OTHER PUBLICATIONS

U.S. Appl. No. 13/358,806, filed Jan. 26, 2012, Mylly, et al., "Apparatus and Method to Provide Cache Move with Non-Volatile Mass Memory System," 45 pages.
(Continued)

*Primary Examiner* — Yong J Choe
(74) *Attorney, Agent, or Firm* — Lee & Hayes, P.C.

(57) ABSTRACT

A method includes, in one non-limiting embodiment, sending a request from a mass memory storage device to a host device, the request being one to allocate memory in the host device; writing data from the mass memory storage device to allocated memory of the host device; and subsequently reading the data from the allocated memory to the mass memory storage device. The memory may be embodied as flash memory, and the data may be related to a file system stored in the flash memory. The method enables the mass memory storage device to extend its internal volatile RAM to include RAM of the host device, enabling the internal RAM to be powered off while preserving data and context stored in the internal RAM.

20 Claims, 7 Drawing Sheets

Related U.S. Application Data continuation of application No. 17/204,591, filed on Mar. 17, 2021, now Pat. No. 11,775,173, which is a continuation of application No. 15/989,695, filed on May 25, 2018, now Pat. No. 10,983,697, which is a continuation of application No. 15/335,688, filed on Oct. 27, 2016, now Pat. No. 9,983,800, which is a continuation of application No. 14/945,757, filed on Nov. 19, 2015, now abandoned, which is a continuation of application No. 14/520,030, filed on Oct. 21, 2014, now Pat. No. 9,208,078, which is a continuation of application No. 12/455,763, filed on Jun. 4, 2009, now Pat. No. 8,874,824.

(52) U.S. Cl.
CPC ........ *G06F 3/0679* (2013.01); *G06F 12/0223* (2013.01); *G06F 12/0246* (2013.01); *G06F 12/0638* (2013.01); *G06F 2212/171* (2013.01); *G06F 2212/205* (2013.01); *G06F 2212/7202* (2013.01); *G06F 2212/7203* (2013.01); *G06F 2212/7207* (2013.01); *Y02D 10/00* (2018.01)

(58) Field of Classification Search
CPC ..... G06F 2212/7202; G06F 2212/7203; G06F 2212/7207; G06F 3/061; G06F 3/0631; G06F 3/0655; G06F 3/0679
See application file for complete search history.

(56) References Cited

U.S. PATENT DOCUMENTS

| | | |
|---|---|---|
| 5,680,570 A | 10/1997 | Rantala |
| 5,701,516 A | 12/1997 | Cheng et al. |
| 5,710,931 A | 1/1998 | Nakamura et al. |
| 5,781,753 A | 7/1998 | McFarland et al. |
| 5,802,069 A | 9/1998 | Coulson |
| 5,805,882 A | 9/1998 | Cooper et al. |
| 5,809,340 A | 9/1998 | Bertone et al. |
| 5,822,553 A | 10/1998 | Gifford et al. |
| 5,924,097 A | 7/1999 | Hill et al. |
| 5,933,626 A | 8/1999 | Mahalingaiah et al. |
| 5,982,570 A | 11/1999 | Koizumi et al. |
| 5,999,876 A | 12/1999 | Irons et al. |
| 6,067,300 A | 5/2000 | Baumert et al. |
| 6,115,785 A | 9/2000 | Estakhri et al. |
| 6,122,196 A | 9/2000 | Tanaka et al. |
| 6,173,425 B1 | 1/2001 | Knaack et al. |
| 6,226,710 B1 | 5/2001 | Melchior |
| 6,279,114 B1 | 8/2001 | Toombs et al. |
| 6,373,768 B2 | 4/2002 | Woo et al. |
| 6,393,492 B1 | 5/2002 | Cornaby et al. |
| 6,480,936 B1 | 11/2002 | Ban et al. |
| 6,513,094 B1 | 1/2003 | Magro |
| 6,522,586 B2 | 2/2003 | Wong |
| 6,526,472 B2 | 2/2003 | Suzuki |
| 6,609,182 B1 | 8/2003 | Pedrizetti et al. |
| 6,665,747 B1 | 12/2003 | Nazari |
| 6,732,221 B2 | 5/2004 | Ban |
| 6,785,764 B1 | 8/2004 | Roohparvar |
| 6,842,391 B2 | 1/2005 | Fujioka et al. |
| 6,842,829 B1 | 1/2005 | Nichols et al. |
| 6,901,298 B1 | 5/2005 | Govindaraj et al. |
| 6,987,635 B2 | 1/2006 | Akagi et al. |
| 7,047,368 B2 | 5/2006 | Vantalon et al. |
| 7,136,963 B2 | 11/2006 | Ogawa et al. |
| 7,181,574 B1 | 2/2007 | Lele |
| 7,233,335 B2 | 6/2007 | Moreton et al. |
| 7,233,538 B1 | 6/2007 | Wu et al. |
| 7,321,958 B2 | 1/2008 | Hofstee et al. |
| 7,395,176 B2 | 7/2008 | Chung et al. |
| 7,412,559 B2 | 8/2008 | Stockdale et al. |
| 7,450,456 B2 | 11/2008 | Jain et al. |
| 7,480,749 B1 | 1/2009 | Danilak |
| 7,492,368 B1 | 2/2009 | Nordquist et al. |
| 7,533,242 B1 | 5/2009 | Moll et al. |
| 7,571,295 B2 | 8/2009 | Sakarda et al. |
| 7,644,938 B2 | 1/2010 | Yamada |
| 7,697,311 B2 | 4/2010 | Fukuda et al. |
| 7,730,248 B2 | 6/2010 | Goss et al. |
| 7,760,569 B2 | 7/2010 | Ruf et al. |
| 7,783,845 B2 | 8/2010 | Bennett et al. |
| 7,809,962 B2 | 10/2010 | Chang et al. |
| 7,855,441 B2 | 12/2010 | Han |
| 7,877,569 B2 | 1/2011 | Honda |
| 7,889,544 B2 | 2/2011 | Chow et al. |
| 7,958,292 B2 | 6/2011 | Sutardja |
| 8,060,767 B1 | 11/2011 | Wright |
| 8,094,500 B2 | 1/2012 | Paley et al. |
| 8,180,975 B2 | 5/2012 | Moscibroda et al. |
| 8,190,803 B2 | 5/2012 | Hobson et al. |
| 8,218,137 B2 | 7/2012 | Noh et al. |
| 8,307,180 B2 | 11/2012 | Hyvonen et al. |
| 8,321,713 B2 | 11/2012 | Nobunaga |
| 8,327,123 B2 | 12/2012 | Juffa et al. |
| 8,514,621 B2 | 8/2013 | Choi et al. |
| 8,527,693 B2 | 9/2013 | Flynn et al. |
| 8,639,874 B2 | 1/2014 | Maule et al. |
| 8,656,045 B2 | 2/2014 | Wallace et al. |
| 8,826,051 B2 | 9/2014 | Wakrat et al. |
| 8,879,346 B2 | 11/2014 | Kam et al. |
| 8,935,302 B2 | 1/2015 | Flynn et al. |
| RE45,486 E | 4/2015 | Ahvenainen et al. |
| 9,003,159 B2 | 4/2015 | Deshkar et al. |
| RE45,542 E | 6/2015 | Mylly |
| 9,063,724 B2 | 6/2015 | Smith et al. |
| 9,063,850 B2 | 6/2015 | Hyvonen et al. |
| 9,069,551 B2 | 6/2015 | Iarovici et al. |
| 9,128,718 B1 | 9/2015 | Lachwani et al. |
| 9,141,394 B2 | 9/2015 | Sakarda |
| 9,208,078 B2 | 12/2015 | Luukkainen et al. |
| 9,311,226 B2 | 4/2016 | Mylly |
| 9,367,486 B2 | 6/2016 | Hyvonen et al. |
| 9,417,998 B2 | 8/2016 | Mylly et al. |
| 9,424,182 B2 | 8/2016 | Fisher et al. |
| 9,645,758 B2 | 5/2017 | Peterson et al. |
| 9,667,425 B2 | 5/2017 | Goss et al. |
| 9,710,377 B1 | 7/2017 | Kuzmin et al. |
| 9,727,454 B2 | 8/2017 | Kuzmin et al. |
| 9,829,951 B2 | 11/2017 | Kumar et al. |
| 9,841,911 B2 | 12/2017 | Yu et al. |
| 9,870,327 B2 | 1/2018 | Chen et al. |
| 9,941,007 B2 | 4/2018 | Peddle et al. |
| 9,952,977 B2 | 4/2018 | Heinrich et al. |
| 9,983,800 B2 | 5/2018 | Luukkainen et al. |
| 10,042,586 B2 | 8/2018 | Mylly |
| 10,095,613 B2 | 10/2018 | Jo et al. |
| 10,402,106 B2 | 9/2019 | Mylly |
| 10,540,094 B2 | 1/2020 | Hyvonen et al. |
| 11,023,142 B2 | 6/2021 | Mylly |
| 11,182,079 B2 | 11/2021 | Hyvonen et al. |
| 2002/0000931 A1 | 1/2002 | Petronic et al. |
| 2002/0087817 A1 | 7/2002 | Tomaiuolo et al. |
| 2002/0093913 A1 | 7/2002 | Brown et al. |
| 2002/0108014 A1 | 8/2002 | Lasser |
| 2002/0138669 A1 | 9/2002 | Kadatch et al. |
| 2002/0138676 A1 | 9/2002 | Kendall et al. |
| 2002/0188835 A1 | 12/2002 | Vavro |
| 2003/0028737 A1 | 2/2003 | Kaiya et al. |
| 2003/0137860 A1 | 7/2003 | Khatri et al. |
| 2003/0212923 A1 | 11/2003 | Coppock et al. |
| 2004/0010671 A1 | 1/2004 | Sampsa et al. |
| 2004/0049692 A1 | 3/2004 | Okamoto |
| 2004/0088474 A1 | 5/2004 | Lin |
| 2004/0203670 A1 | 10/2004 | King et al. |
| 2004/0221124 A1 | 11/2004 | Beckert et al. |
| 2004/0230317 A1 | 11/2004 | Kumar et al. |
| 2004/0230851 A1 | 11/2004 | Chao et al. |
| 2004/0236905 A1 | 11/2004 | Dixon |
| 2005/0010738 A1 | 1/2005 | Stockdale et al. |
| 2005/0071570 A1 | 3/2005 | Takasugl et al. |
| 2005/0097280 A1 | 5/2005 | Hofstee et al. |

(56) References Cited

U.S. PATENT DOCUMENTS

| | | |
|---|---|---|
| 2005/0138318 A1 | 6/2005 | Ash et al. |
| 2005/0204113 A1 | 9/2005 | Harper et al. |
| 2006/0026598 A1 | 2/2006 | Handlogten et al. |
| 2006/0041888 A1 | 2/2006 | Radulescu et al. |
| 2006/0069899 A1 | 3/2006 | Schoinas et al. |
| 2006/0075147 A1 | 4/2006 | Schoinas et al. |
| 2006/0075395 A1 | 4/2006 | Lee et al. |
| 2006/0119602 A1 | 6/2006 | Fisher et al. |
| 2006/0120235 A1 | 6/2006 | Jensen |
| 2006/0129722 A1 | 6/2006 | Campbell |
| 2006/0174056 A1 | 8/2006 | Lambert et al. |
| 2006/0179212 A1 | 8/2006 | Kim et al. |
| 2006/0184758 A1 | 8/2006 | Satori et al. |
| 2006/0224789 A1 | 10/2006 | Cho et al. |
| 2006/0259718 A1 | 11/2006 | Paley |
| 2006/0280077 A1 | 12/2006 | Suwa |
| 2007/0057044 A1 | 3/2007 | Uchiyama et al. |
| 2007/0088867 A1 | 4/2007 | Cho et al. |
| 2007/0136523 A1 | 6/2007 | Bonella et al. |
| 2007/0147115 A1 | 6/2007 | Lin et al. |
| 2007/0168724 A1* | 7/2007 | Kohiga ............... G06F 9/4418 714/23 |
| 2007/0207854 A1 | 9/2007 | Wolf et al. |
| 2007/0226795 A1 | 9/2007 | Conti et al. |
| 2007/0234006 A1 | 10/2007 | Radulescu et al. |
| 2007/0283078 A1 | 12/2007 | Li et al. |
| 2008/0080688 A1 | 4/2008 | Burgan et al. |
| 2008/0081609 A1 | 4/2008 | Burgan et al. |
| 2008/0104291 A1 | 5/2008 | Hinchey |
| 2008/0126857 A1 | 5/2008 | Basham et al. |
| 2008/0127131 A1 | 5/2008 | Gao et al. |
| 2008/0162792 A1 | 7/2008 | Wu et al. |
| 2008/0183954 A1 | 7/2008 | Lee et al. |
| 2008/0184355 A1 | 7/2008 | Walrath et al. |
| 2008/0189485 A1 | 8/2008 | Jung et al. |
| 2008/0195802 A1 | 8/2008 | Lee et al. |
| 2008/0228984 A1 | 9/2008 | Yu et al. |
| 2008/0235477 A1 | 9/2008 | Rawson |
| 2008/0244173 A1 | 10/2008 | Takai |
| 2008/0281944 A1 | 11/2008 | Vorne et al. |
| 2008/0282030 A1 | 11/2008 | Kalwitz et al. |
| 2008/0282031 A1 | 11/2008 | Tanoue |
| 2008/0320211 A1 | 12/2008 | Kinoshita |
| 2009/0106503 A1 | 4/2009 | Lee et al. |
| 2009/0157950 A1 | 6/2009 | Selinger |
| 2009/0164705 A1 | 6/2009 | Gorobets |
| 2009/0182940 A1 | 7/2009 | Matsuda et al. |
| 2009/0182962 A1 | 7/2009 | Khmelnitsky et al. |
| 2009/0198871 A1 | 8/2009 | Tzeng |
| 2009/0198872 A1 | 8/2009 | Tzeng |
| 2009/0210615 A1 | 8/2009 | Struk et al. |
| 2009/0216937 A1 | 8/2009 | Yasufuku |
| 2009/0222629 A1 | 9/2009 | Yano et al. |
| 2009/0292861 A1 | 11/2009 | Kanevsky et al. |
| 2009/0307377 A1 | 12/2009 | Anderson et al. |
| 2009/0307544 A1 | 12/2009 | Kim et al. |
| 2009/0313420 A1 | 12/2009 | Wiesz et al. |
| 2009/0327584 A1 | 12/2009 | Tetrick et al. |
| 2010/0005281 A1 | 1/2010 | Buchmann et al. |
| 2010/0030961 A9 | 2/2010 | Ma et al. |
| 2010/0037012 A1 | 2/2010 | Yano et al. |
| 2010/0082905 A1 | 4/2010 | Wilkerson et al. |
| 2010/0100648 A1 | 4/2010 | Madukkarumukumana et al. |
| 2010/0106886 A1 | 4/2010 | Marcu et al. |
| 2010/0106901 A1 | 4/2010 | Higeta et al. |
| 2010/0115193 A1 | 5/2010 | Manus et al. |
| 2010/0161882 A1 | 6/2010 | Stern et al. |
| 2010/0161888 A1 | 6/2010 | Eggleston |
| 2010/0169558 A1 | 7/2010 | Honda et al. |
| 2010/0169604 A1 | 7/2010 | Trika et al. |
| 2010/0172180 A1 | 7/2010 | Paley et al. |
| 2010/0202239 A1 | 8/2010 | Moshayedi et al. |
| 2010/0250836 A1 | 9/2010 | Sokolov et al. |
| 2010/0268928 A1 | 10/2010 | Wang et al. |
| 2010/0293420 A1 | 11/2010 | Kapil et al. |
| 2010/0306503 A1 | 12/2010 | Henry et al. |
| 2010/0312947 A1 | 12/2010 | Luukkainen et al. |
| 2011/0029808 A1 | 2/2011 | Moshayedi |
| 2011/0082967 A1 | 4/2011 | Deshkar et al. |
| 2011/0087804 A1 | 4/2011 | Okaue et al. |
| 2011/0093650 A1 | 4/2011 | Kwon et al. |
| 2011/0099326 A1 | 4/2011 | Jung et al. |
| 2011/0145537 A1 | 6/2011 | Feldman et al. |
| 2011/0185112 A1 | 7/2011 | Goss |
| 2011/0185113 A1 | 7/2011 | Goss et al. |
| 2011/0208914 A1 | 8/2011 | Winokur et al. |
| 2011/0264860 A1 | 10/2011 | Hooker et al. |
| 2011/0296088 A1 | 12/2011 | Duzly et al. |
| 2011/0302474 A1 | 12/2011 | Goss et al. |
| 2012/0023303 A1 | 1/2012 | Russo et al. |
| 2012/0079171 A1 | 3/2012 | Ju et al. |
| 2012/0102268 A1 | 4/2012 | Smith et al. |
| 2012/0117344 A1 | 5/2012 | Kim et al. |
| 2012/0131263 A1 | 5/2012 | Yeh |
| 2012/0131269 A1 | 5/2012 | Fisher et al. |
| 2012/0151118 A1 | 6/2012 | Flynn et al. |
| 2012/0179874 A1 | 7/2012 | Chang et al. |
| 2012/0210326 A1 | 8/2012 | Torr et al. |
| 2012/0221875 A1 | 8/2012 | Bak et al. |
| 2012/0239990 A1 | 9/2012 | Mataya et al. |
| 2012/0324299 A1 | 12/2012 | Moshayedi |
| 2013/0007347 A1 | 1/2013 | Fai et al. |
| 2013/0007348 A1 | 1/2013 | Fai et al. |
| 2013/0111202 A1 | 5/2013 | Zeng |
| 2013/0124785 A1 | 5/2013 | Xiong et al. |
| 2013/0138840 A1 | 5/2013 | Kegel et al. |
| 2013/0145055 A1 | 6/2013 | Kegel et al. |
| 2013/0166866 A1 | 6/2013 | Yerushalmi et al. |
| 2013/0191609 A1 | 7/2013 | Kunimatsu et al. |
| 2013/0282957 A1 | 10/2013 | Mylly |
| 2013/0332691 A1 | 12/2013 | Hyvonen et al. |
| 2013/0339635 A1 | 12/2013 | Amit et al. |
| 2013/0346668 A1 | 12/2013 | Floman et al. |
| 2013/0346685 A1 | 12/2013 | Hampel et al. |
| 2014/0059273 A1 | 2/2014 | Fujimoto et al. |
| 2014/0068140 A1 | 3/2014 | Mylly |
| 2014/0188719 A1 | 7/2014 | Poornachandran et al. |
| 2014/0304475 A1 | 10/2014 | Ramanujan et al. |
| 2015/0039819 A1 | 2/2015 | Luukkainen et al. |
| 2015/0134871 A1 | 5/2015 | Benisty et al. |
| 2015/0160863 A1 | 6/2015 | Mylly |
| 2015/0269094 A1 | 9/2015 | Hyvonen et al. |
| 2016/0062659 A1 | 3/2016 | Floman et al. |
| 2016/0077963 A1 | 3/2016 | Luukkainen et al. |
| 2016/0246546 A1 | 8/2016 | Mylly |
| 2016/0306588 A1 | 10/2016 | Li et al. |
| 2016/0357436 A1 | 12/2016 | Hyvonen et al. |
| 2017/0038975 A1 | 2/2017 | Mylly et al. |
| 2017/0046067 A1 | 2/2017 | Luukkainen et al. |
| 2018/0130506 A1 | 5/2018 | Kang et al. |
| 2018/0137058 A1 | 5/2018 | Heo et al. |
| 2018/0364909 A1 | 12/2018 | Luukkainen et al. |
| 2019/0034122 A1 | 1/2019 | Mylly |
| 2020/0089403 A1 | 3/2020 | Hyvonen et al. |
| 2020/0218448 A1 | 7/2020 | Hyvonen et al. |
| 2020/0293232 A1 | 9/2020 | Mylly |
| 2021/0191618 A1 | 6/2021 | Mylly et al. |
| 2021/0311626 A1 | 10/2021 | Luukkainen et al. |
| 2021/0382619 A1 | 12/2021 | Hyvonen et al. |
| 2022/0197565 A1 | 6/2022 | Mylly |
| 2023/0027240 A1 | 1/2023 | Luukkainen |
| 2023/0068142 A1 | 3/2023 | Hyvonen |
| 2023/0161477 A1 | 5/2023 | Hyvonen |
| 2023/0418523 A1 | 12/2023 | Mylly |
| 2024/0020008 A1 | 1/2024 | Luukkainen |
| 2024/0152274 A1 | 5/2024 | Mylly et al. |
| 2024/0168635 A1 | 5/2024 | Hyvonen et al. |

FOREIGN PATENT DOCUMENTS

| | | |
|---|---|---|
| CN | 1762025 | 4/2006 |
| CN | 101278354 A | 10/2008 |
| CN | 101329654 | 12/2008 |
| CN | 101449251 A | 6/2009 |

(56) References Cited

FOREIGN PATENT DOCUMENTS

| | | |
|---|---|---|
| CN | 101667103 A | 3/2010 |
| CN | 101714106 | 5/2010 |
| CN | 101887350 | 11/2010 |
| CN | 101937318 | 1/2011 |
| CN | 101952808 | 1/2011 |
| EP | 0481716 | 4/1992 |
| EP | 0749062 A2 | 12/1996 |
| EP | 0749063 A2 | 12/1996 |
| EP | 1091283 | 4/2001 |
| EP | 1094392 | 4/2001 |
| EP | 1779241 | 2/2006 |
| EP | 1763036 | 3/2007 |
| JP | 59135563 | 8/1984 |
| JP | S64064073 | 3/1989 |
| JP | 0268671 | 3/1990 |
| JP | H02068671 | 3/1990 |
| JP | H02170767 A | 7/1990 |
| JP | H11259357 | 9/1990 |
| JP | 06124596 | 5/1994 |
| JP | H06124596 A | 5/1994 |
| JP | H06236681 | 8/1994 |
| JP | H07-105095 A | 11/1995 |
| JP | H08123731 A | 5/1996 |
| JP | H08161216 | 6/1996 |
| JP | 10228413 | 8/1998 |
| JP | H10240607 | 9/1998 |
| JP | 11143643 | 5/1999 |
| JP | H11242563 | 9/1999 |
| JP | 2000003309 | 1/2000 |
| JP | 2000057039 | 2/2000 |
| JP | 2000067584 | 3/2000 |
| JP | 2001006379 | 1/2001 |
| JP | 2001-067786 A | 3/2001 |
| JP | 2002-023962 A | 1/2002 |
| JP | 2002108691 | 4/2002 |
| JP | 2002526875 A | 8/2002 |
| JP | 2002259322 | 9/2002 |
| JP | 2002351741 | 12/2002 |
| JP | 2003015949 | 1/2003 |
| JP | 2003150445 | 5/2003 |
| JP | 2004021669 | 1/2004 |
| JP | 2004511030 | 4/2004 |
| JP | H03687115 B2 | 8/2005 |
| JP | 2005309653 A | 11/2005 |
| JP | 2006011818 | 1/2006 |
| JP | 2006195569 | 7/2006 |
| JP | 2006221627 | 8/2006 |
| JP | 2006520958 | 9/2006 |
| JP | 2006331408 A | 12/2006 |
| JP | 2006343923 A | 12/2006 |
| JP | 2007052717 | 3/2007 |
| JP | 2007079724 | 3/2007 |
| JP | 2007115382 | 5/2007 |
| JP | 2007156597 A | 6/2007 |
| JP | 2007183962 A | 7/2007 |
| JP | 2007518166 | 7/2007 |
| JP | 3965874 B2 | 8/2007 |
| JP | 2007220210 | 8/2007 |
| JP | 2007260013 A | 10/2007 |
| JP | 2008-015623 A | 1/2008 |
| JP | 2008009874 A | 1/2008 |
| JP | 2011022657 | 2/2011 |
| JP | 2011028537 | 2/2011 |
| JP | 2011039849 | 2/2011 |
| JP | 2011086064 | 4/2011 |
| JP | 2011238175 | 11/2011 |
| JP | 2013504815 A | 2/2013 |
| JP | 2013109419 | 6/2013 |
| JP | 2013176088 A | 9/2013 |
| KR | 20060082040 A | 7/2006 |
| KR | 20090033887 A | 4/2007 |
| KR | 100842140 B1 | 6/2008 |
| KR | 20100072068 A | 6/2010 |
| TW | 200701233 | 1/2007 |
| TW | 201135746 | 10/2011 |
| TW | 201209831 | 3/2012 |
| TW | 201214446 | 4/2012 |
| WO | WO88/01772 | 3/1988 |
| WO | WO99/65193 | 12/1999 |
| WO | WO01/35200 A1 | 5/2001 |
| WO | WO2004084231 | 9/2004 |
| WO | WO2005088468 | 6/2005 |
| WO | WO2005066773 A1 | 7/2005 |
| WO | WO2011013350 | 3/2011 |
| WO | WO2012021380 | 2/2012 |

OTHER PUBLICATIONS

Apostolakis, et al., "Software-Based Self Testing of Symmetric Shared-Memory Multiprocessors", IEEE Transactions on Computers, vol. 58, No. 12, Dec. 2009, 13 pages.

Chinese Office Action mailed on Mar. 3, 2020, for the Chinese Patetnt Application No. 201610905925.X, a counterpart foriegn application of the U.S. Appl. No. 13/451,951, 11 pages.

Chinese Board Opinion mailed Apr. 13, 2022 for Chinese Patent Application No. 201610905925.X, a foreign counterpart to U.S. Pat. No. 9,311,226, 7 pages.

Chinese Office Action mailed Sep. 1, 2021 for Chinese Application No. 201810154153.X, a foreign counterpart to U.S. Pat. No. 9,417,998, 8 pages.

Chinese Office Action mailed on Sep. 16, 2019 for Chinese Patent Application No. 201610905925X, a counterpart of U.S. Pat. No. 9,311,226, 6 pages.

Chinese Office Action mailed Nov. 30, 2016 for Chineae patent application No. 201380006769.8, a counterpart foreign application of U.S. Pat. No. 9,417,998.

Chinese Office Action mailed Dec. 15, 2017 for Chinese Patent Application No. 201510093389.3, a counterpart foreign application of U.S. Pat. No. 8,307,180, 6 pgs.

Chinese Office Action mailed Dec. 19, 2013 for Chinese patent application No. 200980106241.1, a counterpart foreign application of U.S. Pat. No. 8,307,180, 3 pages.

Chinese Office Action mailed on Mar. 12, 2019 for Chinese Patent Application No. 201610905925X, a counterpart of U.S. Pat. No. 9,311,226, 7 pages.

Chinese Office Action mailed Mar. 28, 2016 for Chinese Patent Application No. 201380006769.8, a counterpart foreign application of U.S. Appl. No. 13/358,806, 36 pages.

Chinese Office Action mailed Apr. 1, 2016 for Chinese Patent Application No. 201310136995.X, a counterpart foreign application of U.S. Appl. No. 13/451,951, 8 pages.

Chinese Office Action mailed Apr. 21, 2017 for Chinese Patent Application No. 201510093389.3, a counterpart foreign application of U.S. Pat. No. 8,307,180.

Chinese Office Action mailed Apr. 9, 2013 for Chinese patent application No. 200980106241.1, a counterpart foreign application of U.S. Pat. No. 8,307,180, 4 pages.

Chinese Office Action mailed Jun. 20, 2017 for Chinese Patent Application No. 201380006769.8, a counterpart foreign application of U.S. Pat. No. 9,417,998, 8 pgs.

Chinese Office Action mailed Jul. 17, 2015 for Chinese patent application No. 201310136995.X, a counterpart foreign application of U.S. Appl. No. 13/451,951, 28 pages.

Chinese Office Action mailed Aug. 27, 2014 for Chinese patent application No. 200980106241.1, a counterpart foreign application of U.S. Pat. No. 8,307,180, 3 pages.

"Decision" in *Kinston Technology Company* v. *Memory Technologies*, before the Patent Trial and Appeal Board, Case IPR2019-00642, U.S. Pat. No. 8,307,180 B2, Jul. 30, 2019, 37 pages.

"Embedded MultiMediaCard (eMMC) Mechanical Standard", JESD84-C43, JEDEC Standard, JEDEC Solid State Technology Association, Jun. 2007, 13 pages.

European Office Action mailed Jan. 8, 2020 for European Patent Application No. 18213772.9, a counterpart foreign application of U.S. Appl. No. 13/358,806, 7 pages.

European Office Action mailed Jul. 13, 2021 for European Patent Application No. 18215330.4, a counterpart foreign application of U.S. Pat. No. 8,307,180, 7 pages.

(56) References Cited

OTHER PUBLICATIONS

European Office Action mailed Oct. 20, 2022 for European Patent Application No. 18215330.4, a foreign counterpart to U.S. Pat. No. 8,307,180, 4 pages.
European Summons to Attend Oral Proceedings mailed on Dec. 6, 2021, for European Patent Application No. 18213772.9, 21 pages.
European Office Action mailed Jul. 5, 2017 for European patent application No. 09715221.9, a counterpart foreign application of U.S. Pat. No. 8,307,180, 6 pages.
European Search Report for Application No. 09715221.9, dated Oct. 25, 2011, 30 pages.
Extended European Search Report mailed on Mar. 22, 2019 for European Patent Application No. 18213772, 8 pages.
Extended European Search Report mailed on Mar. 22, 2019 for European Patentn Application No. 18213772, 8 pages.
Extended European Search Report mailed on Apr. 1, 2019 for European Patent Application No. 18213772, 9 pages.
Extended European Search Report mailed on May 8, 2019 for European Patent Application No. 18215330.4, 8 pages.
Extended European Search Report mailed Aug. 31, 2015 for European patent application No. 13741595.6, 8 pages.
"1G×8 Bit / 2G×8 Bit / 4G×8 Bit NAND Flash Memory", Nov. 4, 2005, Samsung Electronics—K9XXG08UXM. 50 Pages.
"How to Boot an Embedded System for an eMMC Equipped with a Microsoft FAT File System", AN2539 Numonyx Application Note, Nov. 2008, 25 pages.
JEDEC Standard, "Embedded MultiMediaCard (eMMC) Product Standard, High Capacity," JESD84-A42, Jun. 2007, 29 pages.
JEDEC Standard, "Embedded ZmultiMediaCard(eMMC) eMMC/Card Product Standard, high Capacity, Including Reliable Write, Boot, and Sleep Modes," (MMCA, 4.3), JSEDD84-A43, Nov. 2007, 166 pages.
JEDEC Standard, "Embedded MultiMediaCard (eMMC) Mechanical Standard," JESD84-C43, Jun. 2007, 13 pages.
Japanese Office Action mailed on Oct. 31, 2020 for Japanese Patent Application No. 2018-219218, a counterpart of U.S. Pat. No. 9,417,998, 1 page.
Japanese Office Action mailed Apr. 7, 2022 for Japanese Patent Application No. 2021-069406, a foreign counterpart to U.S. Pat. No. 8,307,180, 13 pages.
Japanese Office Action mailed Oct. 19, 2022 for Japanese Patent Application No. 2021-069406, a foreign counterpart to U.S. Pat. No. 8,307,180, 9 pages.
Japanese Office Action mailed May 6, 2021 for Japanese patent application No. 2019-185570, a counterpart foreign application of U.S. Pat. No. 8,307,180, 4 pages.
Japanese Office Action mailed on Jun. 9, 2020 for Japanese Patent Application No. 2018-219218, a counterpart of U.S. Pat. No. 9,417,998, 6 pages.
Japanese Office Action mailed Jan. 16, 2013 for Japanese patent application No. 2010548134, a counterpart foreign application of U.S. Pat. No. 8,307,180, 6 pages.
Japanese Office Action mailed Jan. 7, 2015 for Japanese patent application No. 2013-103695, a counterpart foreign application of U.S. Pat. No. 8,307,180, 8 pages.
Japanese Office Action mailed Oct. 1, 2018 for Japanese patent application No. 2017-156699, a counterpart foreign application of U.S. Pat. No. 8,307,180, 11 pages.
Japanese Office Action mailed Nov. 25, 2013 for Japanese patent application No. 2013-103695, a counterpart foreign application of U.S. Pat. No. 8,307,180, 8 pages.
Japanese Office Action mailed Dec. 14, 2015 for Japanese patent application No. 2013-103695, a counterpart foreign application of U.S. Pat. No. 8,307,180, 4 pages.
Japanese Office Action mailed Dec. 20, 2016 for Japanese Patent Application No. 2014-553773, a counterpart foreign application of U.S. Pat. No. 9,417,998.
Japanese Office Action mailed Mar. 27, 2018 for Japanese patent application No. 2017-155752, a counterpart foreign application of U.S. Pat. No. 9,417,998.
Japanese Office Action mailed Apr. 21, 2017 for Japanese patent application No. 2015-099731, a counterpart foreign application of U.S. Pat. No. 8,307,180, 6 pages.
Japanese Office Action mailed Jun. 30, 2016 for Japanese Patent Application No. 2015-099731, a counterpart foreign application of U.S. Pat. No. 8,307,180, 9 pages.
Japanese Office Action mailed Jul. 29, 2019 for Japanese patent application No. 2017-156699, a counterpart foreign application of U.S. Pat. No. 8,307,180.
US Office Action for U.S. Appl. No. 13/358,806, mailed on Apr. 30, 2015, Kimmo J. Mylly, "Apparatus and Method to Provide Cache Move With Non-Volatile Mass Memory System", 42 pages.
US Office Action for U.S. Appl. No. 18/045,067, mailed on May 12, 2023, Hyvonen, "Extended Utilization Area for a Memory Device", 9 pgs.
US Office Action for U.S. Appl. No. 14/520,030, mailed on May 20, 2015, Olli Luukkaninen, "Apparatus and Method to Share Host System RAM with Mass Storage Memory RAM", 6 pages.
US Office Action for U.S. Appl. No. 15/235,425, mailed on Jun. 12, 2018, Mylly, "Apparatus and Method to Provide Cache Move With Non-Volatile Mass Memory System", 16 pages.
US Office Action for U.S. Appl. No. 15/235,425, mailed on Jun. 14, 2019, Mylly, "Apparatus and Method to Provide Cache Move with Non-Volatile Mass Memory System"m 17 pages.
US Office Action for U.S. Appl. No. 13/451,951 mailed on Jun. 18, 2015, Kimmo J. Mylly, "Managing Operational State Data of a Memory Module Using Host Memory in Association with State Change", 33 pages.
US Office Action for U.S. Appl. No. 13/527,745, mailed on Jun. 23, 2014, Floman et al., "Virtual Memory Module", 13 pages.
US Office Action for U.S. Appl. No. 14/732,507, mailed on Jul. 1, 2015, Jani Hyvonen, "Extended Utilization Area for a Memory Device", 11 pages.
US Office Action for U.S. Appl. No. 16/598,894, mailed on Jul. 11, 2022, Hyvonen, "Extended Utilization Area for a Memory Device", 9 pages.
US Office action for U.S. Appl. No. 13/951,169, mailed on Jul. 28, 2014, Hyvonen et al., "Extended Utilization Area for a Memory Device", 6 pages.
US Office action for U.S. Appl. No. 14/945,757, mailed on Jul. 28, 2016, Luukkainen et al., "Apparatus and Method to Share Host System RAM with Mass Storage Memory RAM", 5 pages.
US Office action for U.S. Appl. No. 12/455,763, mailed on Aug. 1, 2013, Luukkainen et al., "Apparatus and method to share host system ram with mass storage memory ram", 28 pages.
US Office Action for U.S. Appl. No. 15/085,815, mailed on Aug. 23, 2017, Mylly, "Managing Operational State Data in Memory Module", 10 pages.
US Office Action for U.S. Appl. No. 13/358,806, mailed on Sep. 10, 2014, Kimmo J. Mylly, "Apparatus and Method to Provide Cache Move With Non-Volatile Mass Memory System", 27 pages.
US Office Action for U.S. Appl. No. 17/204,591, mailed on Sep. 2, 2022, Luukkainen, "Apparatus and Method to Share Host System RAM With Mass Storage Memory RAM", 7 Pages.
US Office action for U.S. Appl. No. 14/732,507, mailed on Dec. 10, 2015, Hyvonen et al., "Extended Utilization Area for a Memory Device", 9 pages.
"PCI Local Bus Specification Revision 3.0", PCI-SGI, Feb. 3, 2004, 344 pages, pp. 238-246.
PCT Search Report mailed Feb. 25, 2015 for PCT application No. PCT/US2014/069616, 10 pgs.
PCT Search Report and Written Opinion mailed Mar. 6, 2014 for PCT application No. PCT/US13/56980, 11 pages.
PCT Search Report and Written Opinion mailed Apr. 16, 2014 for PCT application No. PCT/US13/49434, 8 pages.
PCT Search Report and Written Opinion mailed Sep. 5, 2013 for PCT application No. PCT/US13/37298, 9 pages.
International Search Report for PCT Application No. PCT/FI2009/050083 dated Jun. 3, 2009, 4 pages.
Pedersen, Lynne; Design for MISP: A Multiple Instruction Stream Shared Pipeline Processor; University of Illinois at Urbana-Champaign, 1985 (201 pages).

(56) References Cited

OTHER PUBLICATIONS

Powers, Susan et al; AS/400 Disk Storage Topics and Tools; International Technical Support Organization; International Business Machines; Apr. 2000 (252 pages).
"SD Specifications : Part 1 Physical Layer Specification" Oct. 15, 2004, Version 1.10, SD Group (MEI, ScanDisk, Toshiba) and SD Card Association, 164 pages.
Serial ATA International Organization: Serial ATA Revision 3.1, Jul. 2011, 717 pgs.
Tanenbaum, "Structured Computer Organization", Prentice-Hall, Inc, 1984, 5 pages.
"Termination Due to Settlement After Institution of Trial" in *Kinston Technology Company v. Memory Technologies*, before the Patent Trial and Appeal Board, Case IPR2019-00642 (U.S. Pat. No. 8,307,180 B2) dated Sep. 10, 2019, 4 pgs.
"Termination Due to Settlement After Institution of Trial" in *Kinston Technology Company v. Memory Technologies*, before the Patent Trial and Appeal Board, Case IPR2019-00643 (Patent Re. 45,486 E) dated Sep. 10, 2019, 4 pgs.
"Termination Due to Settlement After Institution of Trial" in *Kinston Technology Company v. Memory Technologies*, before the Patent Trial and Appeal Board, Case IPR2019-00645 (U.S. Pat. No. 9,367,486 B2) dated Sep. 10, 2019, 4 pgs.
"Termination Due to Settlement After Institution of Trial" in *Kinston Technology Company v. Memory Technologies*, before the Patent Trial and Appeal Board, Case IPR2019-00648 (U.S. Pat. No. 9,063,850 B2) dated Sep. 10, 2019, 4 pgs.
Taiwanese Office Action mailed on Jun. 15, 2020 for Taiwanese Patent Application No. 107132459, a counterpart of U.S. Pat. No. 9,311,226, 3 pages.
Taiwanese Office Action mailed May 19, 2023 for Taiwanese patent application No. 110117732, a foreign counterpart of U.S. Pat. No. 9,311,226, 32 pages.
Taiwanese Office Action mailed May 23, 2023 for Taiwanese patent application No. 110117732, a foreign counterpart of U.S. Pat. No. 9,311,226, 24 pages.
Taiwanese Office Action mailed on Jun. 15, 2020 for Taiwanese Patent Application No. 107132459, a counterpart of U.S. Pat. No. 9,311,226, 11 pages.
Taiwanese Office Action mailed Aug. 11, 2017 for Taiwanese patent application No. 106101747, a counterpart foreign application of U.S. Pat. No. 9,311,226.
Taiwanese Office Action mailed Jan. 18, 2018 for Taiwanese Patent Application No. 106101747, a counterpart foreign application of U.S. Pat. No. 9,311,226, 4 pgs.
Taiwanese Office Action mailed Oct. 6, 2016 for Taiwanese Patent Application No. 102114073, a counterpart foreign application of U.S. Pat. No. 9,311,226, 6 pgs.
Taiwanese Office Action mailed on Jul. 16, 2019 for Taiwanese Patent Application No. 107132459, a counterpart of U.S. Pat. No. 9,311,226, 5 pages.
Japanese Office Action mailed Aug. 27, 2013 for Japanese patent application No. 2010548134, a counterparf foreign application of U.S. Pat. No. 8,307,180, 4 pages.
Japanese Search Report for Application No. 2010-548134, mailed on May 10, 2012, 11 pages.
Japanese Office Action mailed Nov. 20, 2020 for Japanese Patent Application No. 2019-185570, a counterpart foreign application of U.S. Pat. No. 8,307,180, 4 pages.
Korean Office Action mailed on Oct. 12, 2020 for Korean Patent Application No. 2020-7018006, a counterpart of U.S. Pat. No. 9,417,998, 6 pages.
Korean Office Action mailed on Oct. 12, 2020 for Korean Patent Application No. 2020-7018006, a counterpart of U.S. Pat. No. 9,417,998, 7 pages.
Korean Office Action mailed Feb. 24, 2022 for Korean Application No. 2021-7033814, a foreign counterpart to U.S. Pat. No. 9,417,998, 3 pages.
Korean Office Action mailed Apr. 12, 2023 for Korean patent application No. 2022-7036487, a foreign counterpart of U.S. Pat. No. 9,417,998, 5 pages.
Korean Office Action mailed Mar. 3, 2014 for Korean patent application No. 2013-7002338, a counterpart foreign application of U.S. Pat. No. 8,307,180, 5 pages.
Korean Office Action mailed on May 29, 2019 for Korean Patent Application No. 2014-7019265, a counter part of U.S. Pat. No. 9,417,998, 17 pages.
KoreanOffice Action for Korean Patent Application No. 10-2010-7021534, mailed on Sep. 30, 2011, 3 pages.
Li, et al., "A Method for Improving Concurrent Write Performance by Dynamic Mapping Virtual Storage System Combined with Cache Management", 2011 IEEE 7th International Conference of Parallel Distributed System, Dec. 7-8, 2011, 10 pages.
Lin et al., "A NAND Flash Memory Controller for SDIMMC Flash Memory Card," IEEE Dec. 2006, pp. 933-935.
McLean, Information Technology-AT Attachment with Packet Interface—6 (ATA/ATAPI-6), Revisional 3A, Dec. 2001, 496 pgs.
Mylly, et al., "Apparatus and Method to Provide Cache Move with Non-Volatile Mass Memory System", U.S. Appl. No. 13/358,806, filed Jan. 26, 2012, 45 pages.
Numonyz, "How to boot an embedded system from an eMMCTM equipped with a Microsoft FAT file system." Application note AN2539, Nov. 2008, pp. 1-25.
US Office Action dtd Feb. 8, 2019 for U.S. Appl. No. 15/235,425 "Apparatus and Method to Provide Cache Move with Non-Volatile Mass Memory System" Mylly, 18 pages.
US Office Action for U.S. Appl. No. 17/646,315, mailed on Feb. 23, 2023, Inventor #1Kimmo J. Mylly, "Managing Operational State Data in Memory Module", 5 pages.
US Office Action dated Mar. 5, 2020 for U.S. Appl. No. 15/989,695 "Apparatus and Method to Share Host System RAM With Mass Storage Memory RAM" Luukkainen, 9 pages.
US Office Action dated Mar. 5, 2020 for U.S. Appl. No. 16/054,582 "Managing Operational State Data in Memory Module" Mylly, 8 pages.
US Office Action for U.S. Appl. No. 16/825,653, mailed on Jul. 22, 2021, Hyvonen, "Extended Utilization Area for a Memory Device", 12 Pages.
US Office Action for U.S. Appl. No. 16/892,628, mailed on Sep. 7, 2021, Mylly, "Managing Operational State Data in Memory Module", 7 Pages.
US Office Action for U.S. Appl. No. 16/598,894, mailed on Sep. 9, 2021, Hyvonen, "Extended Utilization Area for a Memory Device", 7 Pages.
US Office Action for U.S. Appl. No. 13/527,745, mailed on Jan. 16, 2015, Matti Floman, "Virtual Memory Module", 22 pages.
US Office Action for U.S. Appl. No. 14/945,757, mailed on Jan. 21, 2016, Luukkainen et al., "Apparatus and Method to Share Host System RAM with Mass Storage Memory RAM", 16 pages.
US Office Action for U.S. Appl. No. 18/045,067, mailed on Jan. 6, 2023, Hyvonen, "Extended Utilization Area for a Memory Device", 8 pages.
US Office Action for U.S. Appl. No. 13/451,951, mailed on Jan. 7, 2014, Kimmo J. Mylly, "Managing Operational State Data in Memory Module", 24 pages.
US Office Action for U.S. Appl. No. 15/235,425, dated Oct. 9, 2019, Mylly, "Apparatus and Method to Provide Cache Move with Non-Volatile Mass Memory System" 19 pages.
US Office Action dated Oct. 10, 2019 for U.S. Appl. No. 15/989,695 "Apparatus and Method to Share Host System RAM With Mass Storage Memory RAM", Luukkainen, 9 pages.
US Office Action for U.S. Appl. No. 15/181,293, mailed on Oct. 4, 2018, Hyvonen et al., "Extended Utilization Area for a Memory Device", 5 pages.
US Office action for U.S. Appl. No. 15/181,293, mailed on Oct. 5, 2017, Hyvonen et al., "Extended Utilization Area for a Memory Device", 7 pages.
US Office Action for U.S. Appl. No. 13/951,169, mailed on Oct. 8, 2013, Jani Hyvonen, "Extended Utilization Area for a Memory Device", 9 pages.

(56) References Cited

OTHER PUBLICATIONS

US Office Action for U.S. Appl. No. 16/054,582, mailed on Nov. 15, 2019, Mylly, "Managing Operational State Data in Memory Module", 7 Pages.
US Office Action for U.S. Appl. No. 13/358,806, mailed on Nov. 27, 2013, Kimmo J. Mylly, "Apparatus and Method to Provide Cache Move With Non-Volatile Mass Memory System", 26 pages.
US Office Action for U.S. Appl. No. 14/566,547, mailed on Nov. 4, 2016, Mylly, "Unified Memory Type Aware Storage Module", 14 pages.
US Office Action for U.S. Appl. No. 13/358,806, mailed on Nov. 6, 2015, Mylly et al., "Apparatus and Method to Provide Cache Move With Non-Volatile Mass Memory System", 44 pages.
US Office Action for U.S. Appl. No. 14/863,253, mailed on Dec. 21, 2015, Matti Floman, "Virtual Memory Module", 15 pages.
US Office Action for U.S. Appl. No. 17/937,901,mailed on Dec. 22, 2022, Luukkainen, "Apparatus and Method to Share Host System RAM With Mass Storage Memory RAM", 13 Pages.
US Office Action for U.S. Appl. No. 13/451,951, mailed on Dec. 4, 2014, Kimmo J. Mylly, "Managing Operational State Data of a Memory Module Using Host Memory in Association with State Change", 24 pages.
US Office Action for U.S. Appl. No. 14/520,030, mailed on Dec. 4, 2014, Olli Luukkainen, "Apparatus and Method to Share Host System RAM with Mass Storage Memory RAM", 6 pages.
US Office Action for U.S. Appl. No. 13/596,480, mailed on Mar. 13, 2014, Kimmo J. Mylly, "Dynamic Central Cache Memory", 15 pages.
US Office Action for U.S. Appl. No. 12/455,763, mailed on Mar. 14, 2014, Luukkainen et al., "Apparatus and method to share host system ram with mass storage memory ram", 6 pages.
US Office Action for U.S. Appl. No. 17/132,539, mailed on Mar. 16, 2023, Mylly, "Apparatus and Method to Provide Cache Move with Non-Volatile Mass Memory System", 16 Pages.
US Office Action for U.S. Appl. No. 15/335,688, mailed on Mar. 24, 2017, Olli Luukkainen, "Apparatus and Method to Share Host System RAM with Mass Storage Memory RAM", 5 pages.
US Office Action for U.S. Appl. No. 13/951,169, mailed on Mar. 27, 2014, Jani Hyvonen, "Extended Utilization Area for a Memory Device", 10 pages.
US Office Action for U.S. Appl. No. 17/132,539, mailed on Mar. 31, 2022, Mylly, "Apparatus and Method to Provide Cache Move with Non-Volatile Mass Memory System", 15 Pages.
US Office Action for U.S. Appl. No. 16/598,894, mailed on Mar. 4, 2021, Hyvonen, "Extended Utilization Area for a Memory Device", 7 pages.
US Office Action for U.S. Appl. No. 15/989,695, mailed on Apr. 11, 2019, Luukkainen et al., "Apparatus and Method to Share Host System RAM with Mass Storage Memory RAM", 9 pages.
US Office Action dated Apr. 17, 2020 for U.S. Appl. No. 15/235,425 "Apparatus and Method to Provide Cache Move with Non-Volatile Mass Memory System" Mylly, 21 pages.
US Office action for U.S. Appl. No. 15/181,293, mailed on Apr. 18, 2018, Hyvonen et al., "Extended Utilization Area for a Memory Device", 11 page.
US Office action for U.S. Appl. No. 15/181,293, mailed on Apr. 24, 2019, Hyvonen et al., "Extended Utilization Area for a Memory Device", 6 pages.
"Embedded MultiMediaCard (eMMC) Product Standard, High Capacity", JEDEC Solid State Technology Association, JESD84-A42, JEDEC Standard, Jun. 2007, 29 pages.
Japanese Office Action mailed Feb. 26, 2024 for Japanese Application No. 2023-021268, a foreign counterpart to U.S. Pat. No. 8,307,180, 18 pages.
Korean Office Action mailed Feb. 19, 2024 for Korean Application No. 10-2022-7036487, a foreign counterpart to U.S. Pat. No. 9,417,998, 8 pages.
Office Action for US Patent Application Jun. 21, 2024, Hyvonen, "Extended Utilization Area for a Memory Device", 6 Pages.
Office Action for U.S. Appl. No. 18/486,826, mailed on Jul. 18, 2024, "Apparatus and Method to Provide Cache Move with Non-Volatile Mass Memory System", 14 Pages.
Office Action for U.S. Appl. No. 18/464,711, mailed on Sep. 24, 2024, Mylly, "Managing Operational State Data in Memory Module", 11 Pages.
Office Action for U.S. Appl. No. 18/351,408, mailed on Oct. 21, 2024, Luukkainene, "Apparatus and Method to Share Host System RAM With Mass Storage Memory RAM", 8 Pages.
Office Action for Taiwanese Application No. 110117732, Dated Oct. 29, 2024, 4 pages.
Office Action for U.S. Appl. No. 18/464,711, dated Feb. 11, 2025, 12 pages.
Office Action for U.S. Appl. No. 18/486,826, dated Feb. 13, 2025, 16 pages.

\* cited by examiner

APPARATUS AND METHOD TO SHARE HOST SYSTEM RAM WITH MASS STORAGE MEMORY RAM

RELATED APPLICATION

This patent application is a continuation of co-pending U.S. patent application Ser. No. 17/937,901, filed Oct. 4, 2022, which is a continuation of U.S. patent application Ser. No. 17/204,591, filed Mar. 17, 2021, which is a continuation of U.S. patent application Ser. No. 15/989,695, filed May 25, 2018, now U.S. Pat. No. 10,983,697 issued Apr. 20, 2021, which is a continuation U.S. patent application Ser. No. 15/335,688, filed Oct. 27, 2016, now U.S. Pat. No. 9,983,800 issued May 29, 2018, which is a continuation of U.S. patent application Ser. No. 14/945,757, filed Nov. 19, 2015, which is a continuation of U.S. patent application Ser. No. 14/520,030, filed Oct. 21, 2014, now U.S. Pat. No. 9,208,078 and issued Dec. 8, 2015, which is a continuation of U.S. patent application Ser. No. 12/455,763, filed Jun. 4, 2009, now U.S. Pat. No. 8,874,824 and issued Oct. 28, 2014. The entire contents of U.S. utility patent application Ser. No. 17/204,591, 15/989,695, 15/335,688, 14/945,757, 14/520,030, and 12/455,763, and U.S. Pat. Nos. 10,983,697, 9,983,800, 9,208,078 and 8,874,824 are fully incorporated herein by reference.

TECHNICAL FIELD

The exemplary and non-limiting embodiments of this invention relate generally to memory storage systems, methods, devices and computer programs and, more specifically, relate to mass memory devices, such as those containing non-volatile flash memory.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

CPU central processing unit
eMMC embedded multimedia card
exFAT extended file allocation table
LBA logical block address
MMC multimedia card
RAM random access memory
SCSI small computer system interface
SD secure digital
SW software
UFS universal flash storage Various types of flash-based mass storage memories currently exist. A basic premise of mass storage memory is to hide the flash technology complexity from the host system. A technology such as eMMC is one example.

FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC. The JEDEC eMMC includes, in addition to the flash memory itself, an intelligent on-board controller that manages the MMC communication protocol. The controller also handles block-management functions such as logical block allocation and wear leveling. The interface includes a clock (CLK) input. Also included is a command (CMD), which is a bidirectional command channel used for device initialization and command transfers. Commands are sent from a bus master to the device, and responses are sent from the device to the host. Also included is a bidirectional data bus (DAT[7:0]). The DAT signals operate in push-pull mode. By default, after power-up or RESET, only DAT0 is used for data transfer. The memory controller can configure a wider data bus for data transfer using either DAT[3:0] (4-bit mode) or DAT[7:0] (8-bit mode).

One non-limiting example of a flash memory controller construction is described in "A NAND Flash Memory Controller for SD/MMC Flash Memory Card", Chuan-Sheng Lin and Lan-Rong Dung, IEEE Transactions of Magnetics, Vol. 43, No. 2, February 2007, pp. 933-935 (hereafter referred to as Lin et al.) FIG. 1B reproduces FIG. 1 of Lin et al., and shows an overall block diagram of the NAND flash controller architecture for a SD/MMC card. The particular controller illustrated happens to use a w-bit parallel Bose-Chaudhuri-Hocquengham (BCH) error-correction code (ECC) designed to correct random bit errors of the flash memory, in conjunction with a code-banking mechanism. Of particular interest herein are the various RAM memories (e.g., buffer RAM, bank RAM, common RAM) that form part of the controller architecture.

Reference may also be made to US Patent Application Publication 2008/0228984, Sep. 18, 2008, "Single-Chip Multi-Media Card/Secure Digital (MCC/SD) Controller Reading Power-On Boot Code from Integrated Flash Memory for User Storage", I-Kang Yu et al. This publication describes another example of a flash controller where a Multi-Media Card/Secure Digital (MMC/SD) single-chip flash device contains a MMC/SD flash microcontroller and flash mass storage blocks containing flash memory arrays that are block-addressable rather than randomly-addressable. MMC/SD transactions from a host MMC/SD bus are read by a bus transceiver on the MMC/SD flash microcontroller. Various routines that execute on a CPU in the MMC/SD flash microcontroller are activated in response to commands in the MMC/SD transactions. A flash-memory controller in the MMC/SD flash microcontroller transfers data from the bus transceiver to the flash mass storage blocks for storage. Rather than booting from an internal ROM coupled to the CPU, a boot loader is transferred by direct memory access (DMA) from the first page of the flash mass storage block to an internal RAM. The flash memory is automatically read from the first page at power-on. The CPU then executes the boot loader from the internal RAM to load the control program. This approach is said to enable the microcontroller ROM to be eliminated or minimized.

Also of potential interest is an application note AN2539 "How to boot an embedded system from an eMMC' equipped with a Microsoft FAT file system", Numonyx B. V., November 2008. This application note in Appendix A provides an overview of eMMC, and in Appendix B provides an overview of FAT.

SUMMARY

In a first aspect thereof the exemplary embodiments of this invention provide a method that comprises, in response to an allocation of read/write memory in a host device for use by a mass memory storage device, writing data from the mass memory storage device to the allocated read/write memory of the host device; and subsequently reading the data from the allocated memory to the mass memory storage device.

In another aspect thereof the exemplary embodiments of this invention provide an apparatus that comprises a controller; a volatile memory that is readable and writable by the controller; a non-volatile memory that is readable and writable by the controller; and an interface for connecting the apparatus to a host device. The controller is configurable to respond to an allocation of read/write memory in the host device to write data to the allocated memory of the host device, and to subsequently read the data from the allocated memory.

In another aspect thereof the exemplary embodiments of this invention provide a method that comprises allocating read/write memory in a host device for use by a mass memory storage device; receiving data from the mass memory storage device and writing the received data into the allocated read/write memory of the host device; and subsequently sending the data from the allocated memory to the mass memory storage device.

In a still further aspect thereof the exemplary embodiments of this invention provide an apparatus that comprises a controller; a memory that is readable and writable by the controller; and an interface for connecting the apparatus to a mass storage memory device. The controller is configurable to allocate a portion of the memory for use by the mass storage memory device. The controller is further configurable to receive data from the mass storage memory device and to store the received data in the allocated portion of the memory, and to subsequently send the data from the allocated portion of the memory to the mass storage memory device.

DETAILED DESCRIPTION

At present, most mass storage memories provide LBA-based access, e.g., eMMC and different types of external memory cards such as SD. However, it may also be the case that the entire file system (FS) SW is embedded in the mass storage memory device.

When a mass storage memory is used in a high volume consumer device, such as a mobile wireless communication device, one important consideration is cost, and one factor affecting the cost is the amount of RAM in the mass storage memory device itself.

Another important consideration is performance. The overall performance depends on many factors. For example, for lengthy (time consuming) operations (in particular if the mass storage memory device contains an entire file system SW) there would be an advantage to include a substantial amount of RAM in the mass storage memory device. However, this can have a negative impact on the cost.

It may be the case that system context (metadata) would be stored in the flash memory of the mass storage memory device. However, this approach has several associated disadvantages. For example, repeatedly writing the system context (metadata) to the mass storage memory device raises wearing issues that can impact the usable life of the mass storage memory device. Also, writing data to the flash memory can be a relatively slow process.

Another important consideration is the power efficiency. To provide good power efficiency the mass storage memories are preferably shutdown (powered-off) when not needed (meaning also that the internal RAM of the device is preferably shutdown as well). However, and assuming that the RAM is volatile in nature, then whatever data is stored in the RAM is lost when the power is removed from the RAM. To then perform re-initialization after power-up all needed information (e.g., logical-to-physical mapping information and/or file system structures) need to be restored. A full re-initialization of a LBA mass storage memory may require a substantial (and user-noticeable) amount of time (e.g., up to one second with an SD card), and entire file system initialization (if the file system is resident in the mass storage memory) may take even longer. Therefore, it is desirable to retain internal device context over the power-off/power-on cycle.

Figure 1A:
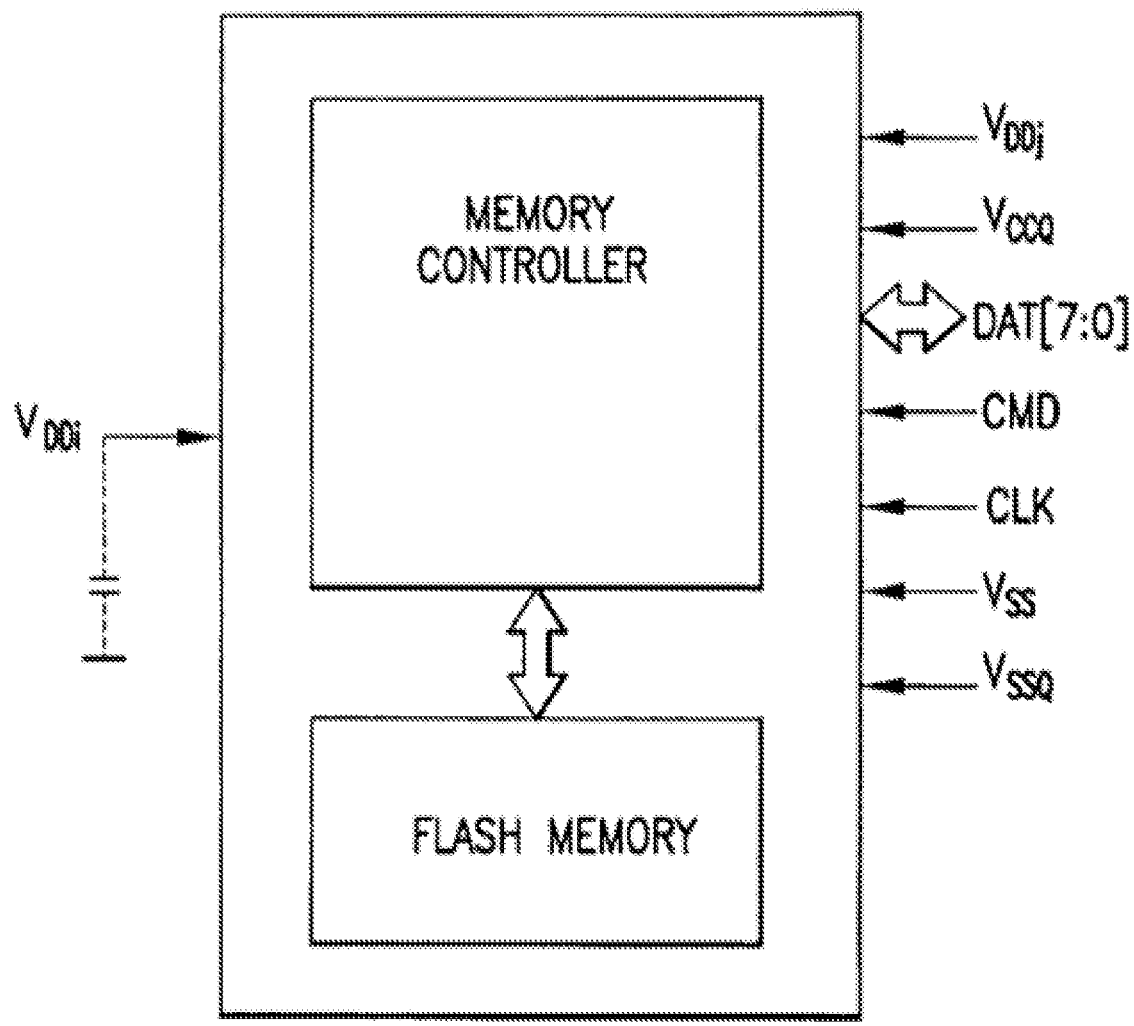
FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC.
Figure 1B:
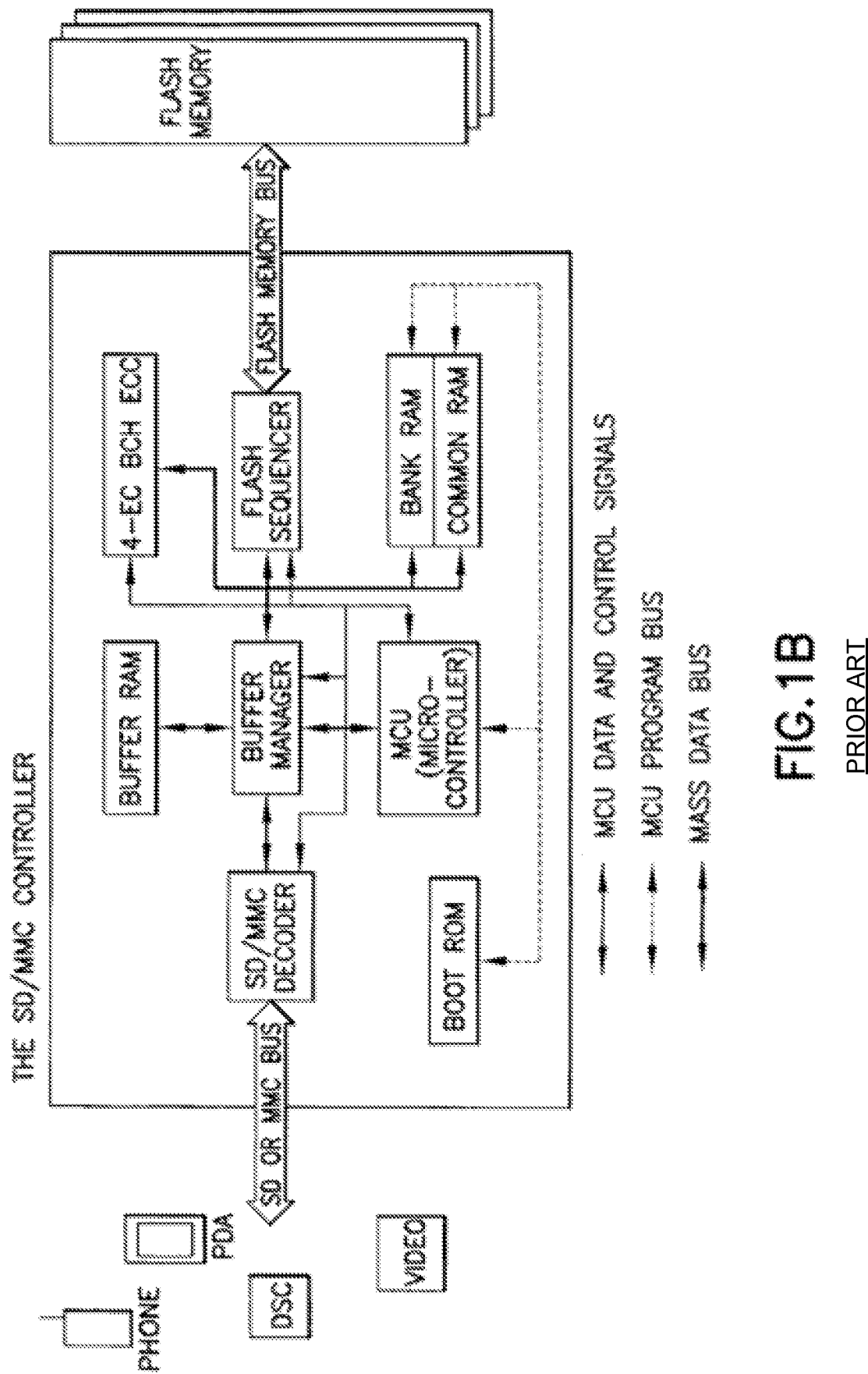
FIG. 1B reproduces FIG. 1 of Lin et al., and shows an example of an overall block diagram of a NAND flash controller architecture for a SD/MMC card.
Figure 2:
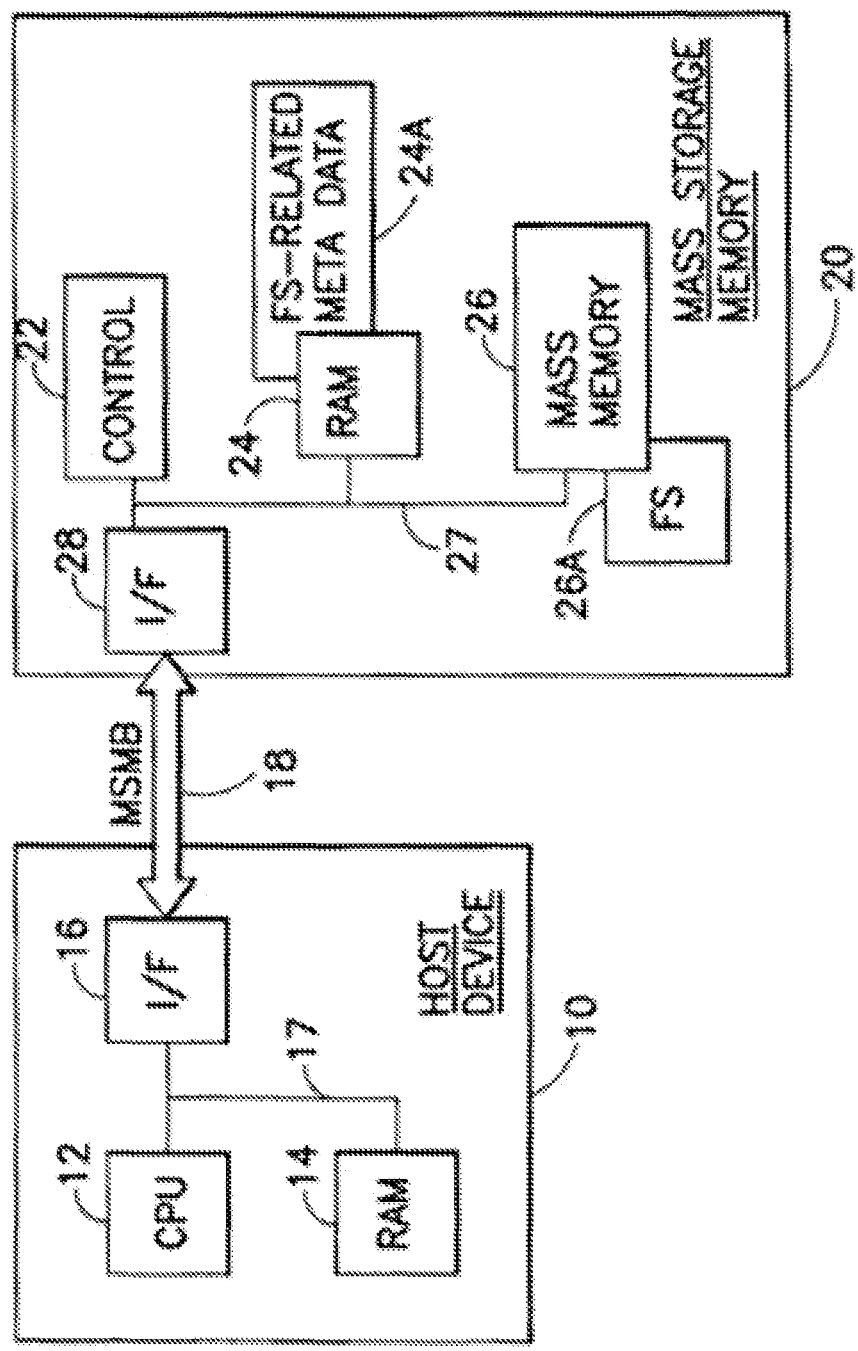
FIG. 2 is a simplified block diagram of a host device connected with a mass storage memory device, and is helpful in describing the exemplary embodiments of this invention.

Before further describing the exemplary embodiments of this invention, reference is made to FIG. 2 which shows is a simplified block diagram of a host system or device 10 connected with a mass storage memory 20 via a mass storage memory bus (MSMB) 18. The MSMB 18 may be compatible with any suitable mass memory interface standard such as MMC or UFS, as two non-limiting examples. The MSMB 18 may include signal lines such as those shown in FIG. 1A for an eMMC embodiment. The host device 10 includes at least one controller, such as a CPU 12 that operates in accordance with stored program instructions. The program instructions may be stored in a RAM 14 or in another memory or memories. The CPU 12 is connected with the RAM 14 and a MSMB interface (I/F) 16 via at least one internal bus 17. The MSMB interface 16 may include a memory controller (MC), or may be coupled with a MC unit associated with the CPU 12. The host device 10 may be a computer, a cellular phone, a digital camera, a gaming device or a PDA, as several non-limiting examples. Note that the RAM 14 may be any read/write memory or memory device, such as semiconductor memory or a disk-based memory.

The mass storage memory 20 includes a microcontroller or, more simply, a controller 22 that is connected via at least one internal bus 27 with a volatile RAM 24, a non-volatile mass memory 26 (e.g., a multi-gigabyte flash memory mass storage) and a MSMB interface (I/F) 28. The controller 22 operates in accordance with stored program instructions. The program instructions may be stored in the RAM 24 or in a ROM or in the mass memory 26. The mass storage memory 20 may be embodied as an MMC, eMMC or a SD device, as non-limiting examples, and may be external to (plugged into) the host device 10 or installed within the host device 10. Note that the mass memory 26 may, in some embodiments, store a file system (FS) 26A. In this case then the RAM 24 may store FS-related metadata 24A, such as one or more data structures comprised of bit maps, file allocation table data and/or other FS-associated information.

The exemplary embodiments of this invention provide a technique to share the RAM 14 of the host device 10 with the mass storage memory device 20. It may be assumed that the host device 10 (e.g., a mobile computer, a cellular phone, a digital camera, a gaming device, a PDA, etc.) has the capability to allocate and de-allocate the RAM 14. As will be discussed in further detail below, the allocation of the RAM 14 may be performed dynamically or it may be performed statically. The allocation of a portion of the RAM may be performed in response to a request received at the host device 10, or at the initiative of the host device 10.

In the exemplary embodiments of this invention the RAM 14 allocation is provided for the mass storage memory 20 (connected via the MSMB 18 to the host CPU 12), if the mass storage memory 20 has a need to extend its own RAM 24 space and/or if the mass storage memory 20 has a need for non-volatile RAM (the contents of which are not lost when the mass storage memory 20 is powered-off). It is also within the scope of the exemplary embodiments of this invention for the mass storage memory 20 to read and/or write (R/W) allocated RAM 14 in the host device 10. The allocation/de-allocation and R/W access methods may be implemented by extensions to a command set used to communicate with the mass storage memory 20 via an applicable mass storage memory protocol.

Figure 3:
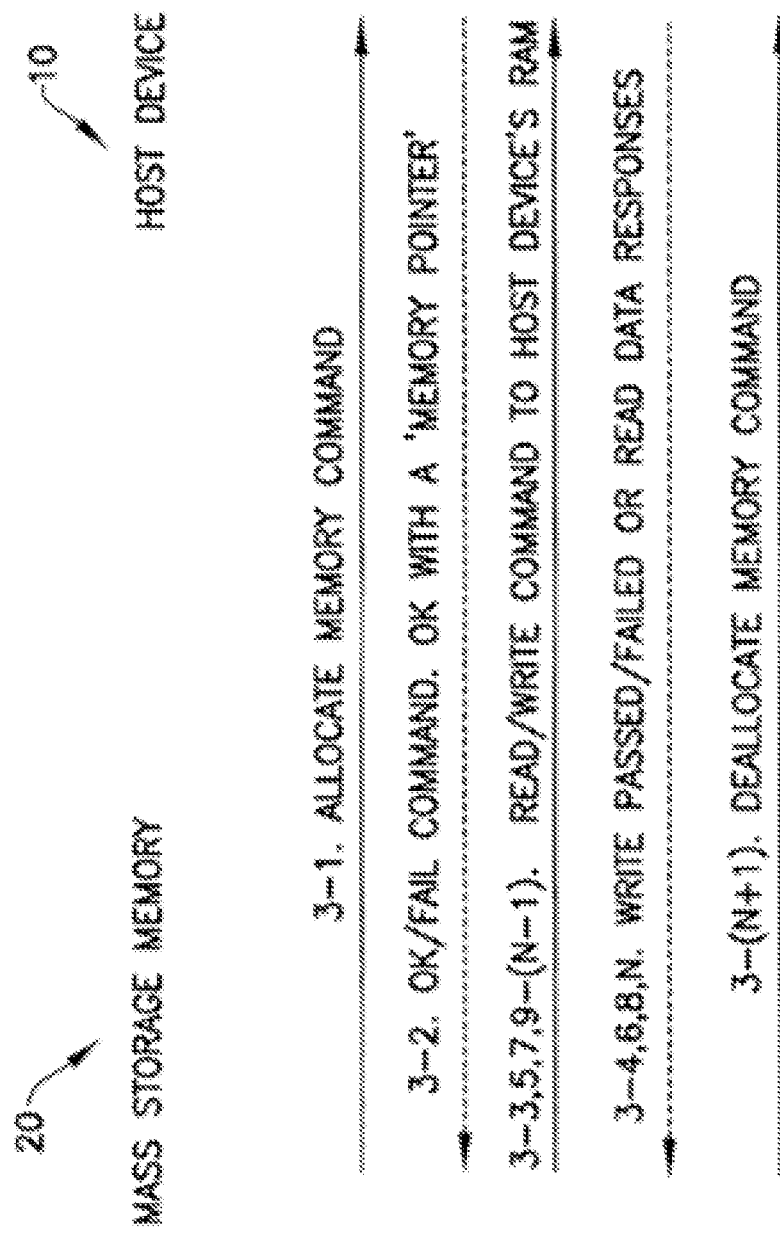
FIG. 3 is a signal/message flow diagram that describes an exemplary embodiment of this invention for the mass storage memory device of FIG. 2 to allocate, use and de-allocate RAM of the host device.

In accordance with certain exemplary embodiments of this invention the mass storage memory device 20 is provided with a mechanism to interrupt/send a message to host device 10 to initiate an allocation of space in the RAM 14. The interrupt/message is sent over the MSMB 18, and may be considered as an extension to current command sets. Referring to FIG. 3, an allocate memory command is sent during operation 3-1. If the allocation request succeeds (indicated during operation 3-2) the controller 22 is enabled to extend its own RAM 24 with the RAM 14 of the host device 10. The mass storage memory device 20 may store, for example, large tables into the RAM 14 using a RAM WRITE command (a newly specified command), or it may fetch data from the host device RAM 14 using a RAM READ command (another newly specified command). The read or write operation is shown as interleaved operations 3-3, 3-4, 3-5, 3-6, . . . , 3-(N−1), 3-N. When the mass storage memory device 20 completes the operation with the RAM 14 it may free the host device RAM 14 using another newly specified command that requests that the host 10 RAM memory be de-allocated (operation 3-(N+1)).

Figure 4:
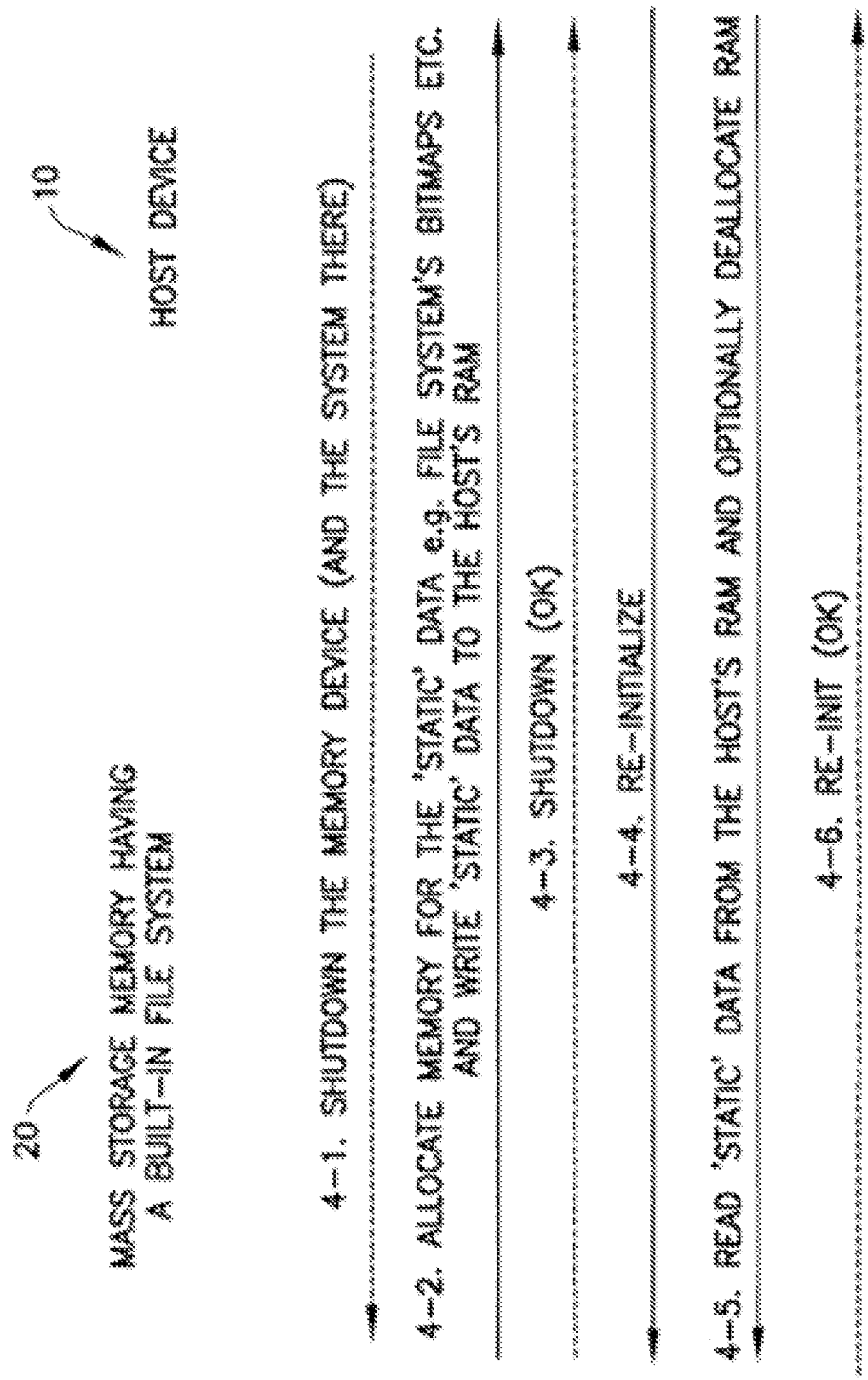
FIG. 4 is a signal/message flow diagram that describes another exemplary embodiment of this invention, where the mass storage memory device of FIG. 2 has a built-in file system.

FIG. 4 illustrates a further exemplary embodiment that utilizes the host system RAM 14 for the mass storage memory 26 having a built-in file system, such as the FS 26A shown in FIG. 2. First the host system 10 sends a SHUT-DOWN command to the mass storage memory device 20 (operation 4-1). Next the mass storage memory device 20 allocates RAM 14 from the host 10 and then loads (stores using a RAM WRITE command) all vital 'static' file system-related data (meta-data 24A) into host RAM 14 (operation 4-2). 'Static' data in this context may be, for example, various bitmaps, such as an allocation bitmap in the exFAT or ext3 file systems. This data may be processed (e.g., at least one of sorted, arranged and filtered) by the CPU 12 (controller) of the host device, and may include data from a large number of sectors in the mass storage memory 26. Mass memory storage device 20 may then send a shutdown OK indication (operation 4-3). The host 10 can remove power from the mass memory storage device 20, and the device 20 may be physically removed from the MSMB 18. Re-initialization (operations 4-4, 4-5, 4-6) of the mass storage memory device 20 is performed when host device 10 needs to get/put certain data from or into the mass storage memory device 20. Re-initialization of the mass storage memory 26 (and the file system 26A) may be sped up by using the sorted/arranged/filtered read data from the RAM 14. When the re-initialization operation is completed the mass storage memory device 20 may de-allocate the used RAM 14 in the host device 10, or the RAM 14 may not be de-allocated thereby reserving the RAM space for future use by the mass storage memory device 20.

It should be noted that in other exemplary embodiments of this invention the allocation of host RAM 14 may occur differently. For example, the host device 10 may allocate RAM 14 dynamically and pass a 'pointer' to the allocated RAM to the mass storage memory device 20. It is then up to the controller 22 of the mass storage memory device 20 how to utilize the allocated host RAM 14. Note that in this embodiment an explicit allocation request from the mass storage memory device 20 may not be sent to the host device 10. Instead, the host device 10 may on its own initiative allocate a portion of the RAM 14, such as when it first detects the presence of the mass memory storage device 20. Of course, subsequent signaling between the mass storage memory device 20 and the host device 10 may be used to change the size of the allocated RAM 14 if the initial allocation is not sufficient for the needs of the controller 22. As another example of RAM 14 allocation, a portion of the RAM 14 may be allocated by the host 10 in a static manner, and the mass storage memory device 20 then simply uses the same portion of the RAM 14 each time it needs to extend the RAM 24. In this case the mass storage memory device 20 may already have knowledge of the location/size of the allocated RAM 14, and a pointer is not needed to be sent from the host device 10.

Note that while it may typically be the case that the mass storage memory device 20 will receive an allocation of host memory to store contents of the volatile RAM 24, in general the allocation may be for storing data for any read/write memory contained within the mass storage memory device 20.

Figure 5:
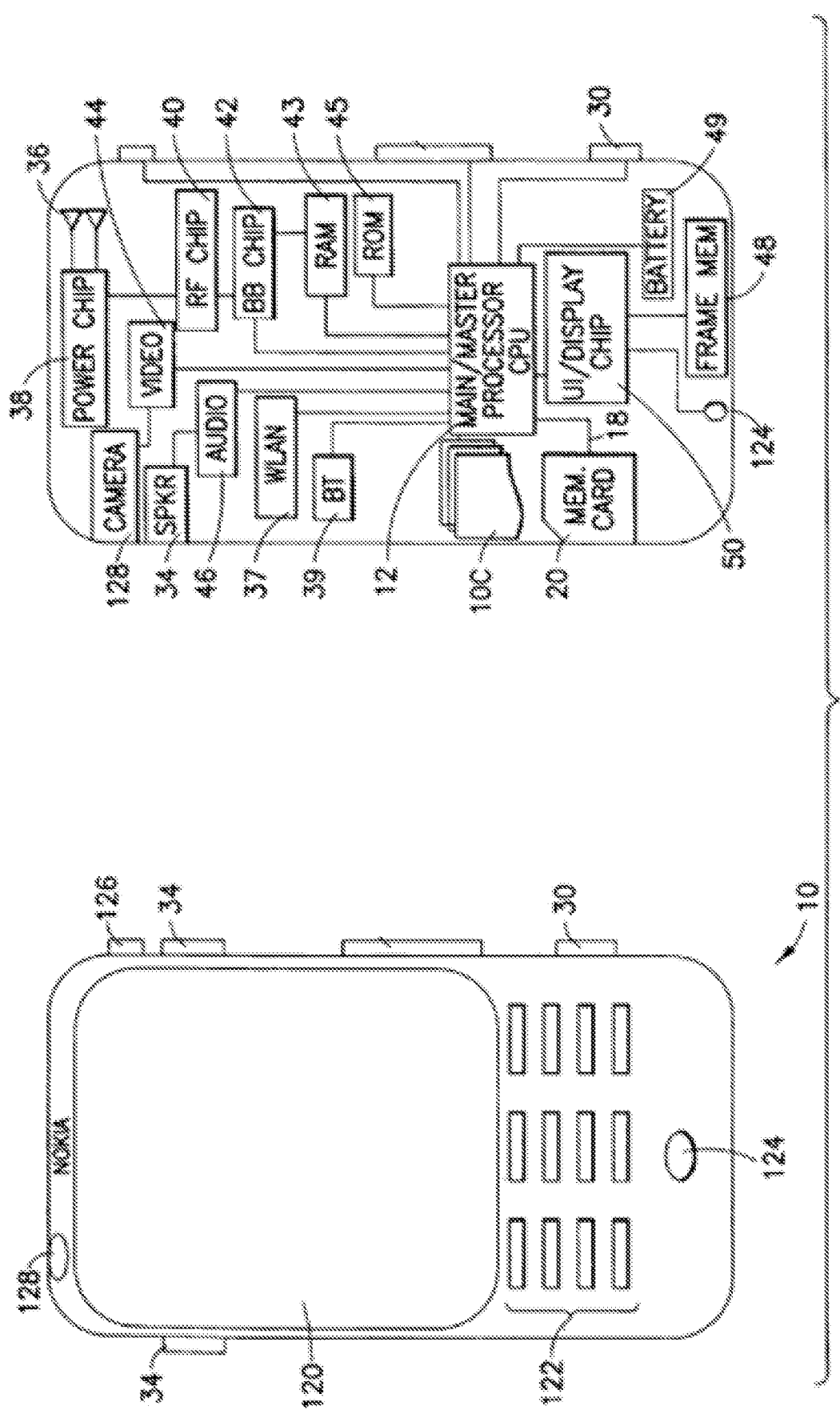
FIG. 5 shows a block diagram of one exemplary embodiment of the host device when embodied as a wireless communication device.

FIG. 5 illustrates one non-limiting embodiment of the host device 10 used with the mass storage memory device 20, referred to in FIG. 5 simply as a memory card. In this exemplary embodiment the host device is embodied as a user equipment (UE), shown in both plan view (left) and sectional view (right). In FIG. 5 the UE 10 has a graphical display interface 120 and a user interface 122 illustrated as a keypad but understood as also encompassing touch screen technology at the graphical display interface 120 and voice recognition technology received at the microphone 124. A power actuator 126 controls the device being turned on and off by the user. The exemplary UE 10 may have a camera 128 which is shown as being forward facing (e.g., for video calls) but may alternatively or additionally be rearward facing (e.g., for capturing images and video for local storage). The camera 128 is controlled by a shutter actuator 30 and optionally by a zoom actuator which may alternatively function as a volume adjustment for the speaker(s) 34 when the camera 128 is not in an active mode.

Within the sectional view of FIG. 5 are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to a radio frequency (RF) chip 40 which demodulates and downconverts the signal for baseband processing. A baseband (BB) chip 42 detects the signal which is then converted to a bit stream and finally decoded. Similar processing occurs in reverse for signals generated in the host device 10 and transmitted from it.

Signals going to and from the camera 128 may pass through an image/video processor 44 that encodes and decodes the various image frames. A separate audio processor 46 may also be present controlling signals to and from the speakers 34 and the microphone 124. The graphical display interface 120 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth7 radio 39, which may incorporate an antenna on the chip or be coupled to an antenna off the chip. Throughout the apparatus are various memories such as random access memory RAM 43, read only memory ROM 45, and in some embodiments removable memory such as the illustrated memory card 20 on which various programs 10C may be stored. All of these components within the UE 10 are normally powered by a portable power supply such as a battery 49.

The processors 38, 40, 42, 44, 46, 50, if embodied as separate entities in a UE 10, may operate in a slave relationship to the main processor (CPU) 12, which may then be in a master relationship to them. Certain embodiments may be disposed across various chips and memories as shown, or disposed within another processor that combines some of the functions described above for FIG. 5. Any or all of these various processors of FIG. 5 access one or more of the various memories, which may be on chip with the processor or separate from the chip with the processor. Note that the various integrated circuits (e.g., chips 38, 40, 42, etc.) that were described above may be combined into a fewer number than described and, in a most compact case, may all be embodied physically within a single chip.

In this exemplary embodiment the CPU 12 of the UE 10 (the host device) operates with the memory card 20 (the mass storage memory device) as described above with respect to FIGS. 3 and 4 so that the RAM 24 of the memory card 20 may be extended to use the RAM 14 of the UE 10.

There are a number of technical effects that may be realized by the use of the exemplary embodiments of the invention. For example, there is provided a cost efficient way to extend RAM in the mass storage memory device 20. Further by example, the mass storage memory device 20 may be powered off, while retaining mass storage memory device information on the RAM 14 of the host system.

Based on the foregoing it should be apparent that the exemplary embodiments of this invention provide a method, apparatus and computer program(s) to extend the RAM of a mass storage memory device to include the RAM of an attached host device.

Figure 6:
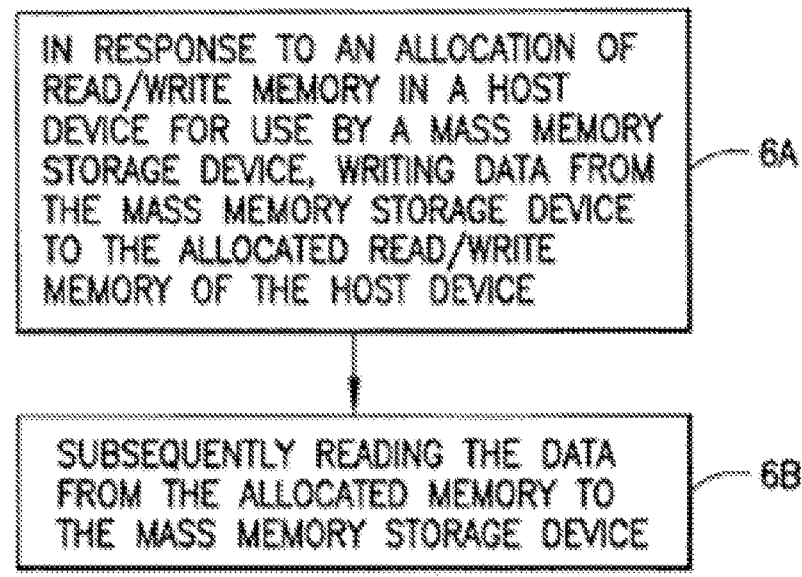
FIG. 6 is a logic flow diagram that illustrates the operation of a method, and a result of execution of computer program instructions embodied on a computer readable memory, in accordance with the exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 6A, in response to an allocation of read/write memory in a host device for use by a mass memory storage device, writing data from the mass memory storage device to the allocated read/write memory of the host device. At Block 6B there is an operation of subsequently reading the data from the allocated memory to the mass memory storage device.

Figure 7:
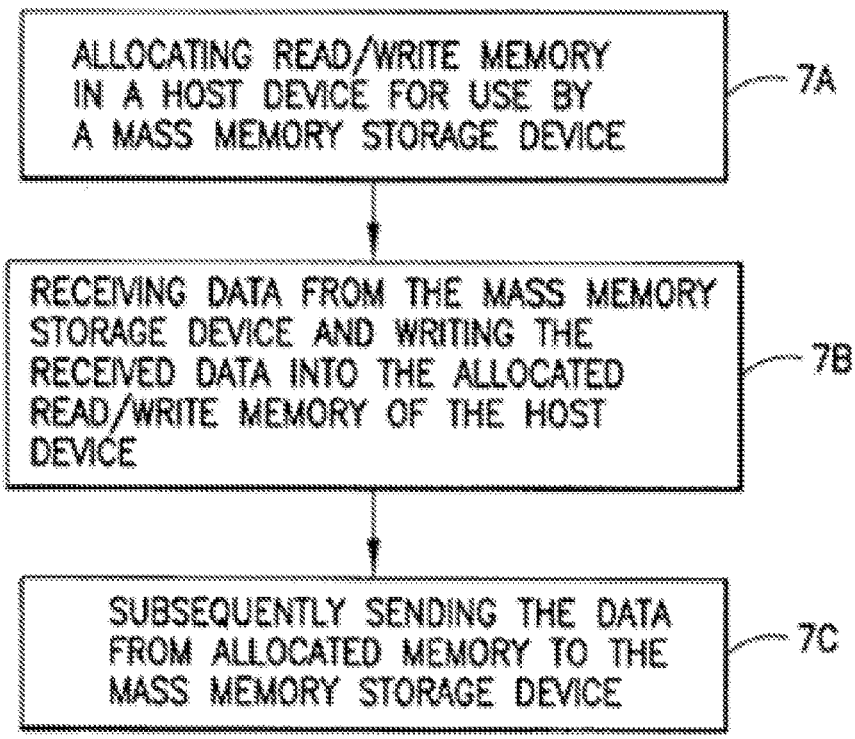
FIG. 7 is a logic flow diagram that illustrates the operation of a method, and a result of execution of computer program instructions embodied on a computer readable memory, further in accordance with the exemplary embodiments of this invention.

FIG. 7 is a logic flow diagram that illustrates the operation of a method, and a result of execution of computer program instructions, in accordance with the exemplary embodiments of this invention. In accordance with these exemplary embodiments a method performs, at Block 7A, an operation of allocating read/write memory in a host device for use by a mass memory storage device. At Block 7B there is an operation of receiving data from the mass memory storage device and writing the received data into the allocated read/write memory of the host device. At Block 7C there is an operation of subsequently sending the data from the allocated memory to the mass memory storage device.

The various blocks shown in FIGS. 6 and 7 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A memory device comprising:
   a controller;
   a random access memory (RAM) that is readable and writable by the controller; and
   an interface for connecting the memory device to a host device, wherein the host device is separate from the memory device,
   the controller operable to:
   receive, via the interface and from the host device, a SHUTDOWN command;
   allocate, responsive at least in part on the SHUTDOWN command, a portion of second RAM associated with the host device;
   receive, from the host device and via the interface, an indication of an allocation of the portion of the second RAM associated with the host device;
   store, responsive to the SHUTDOWN command, data to the portion of the second RAM associated with the host device; and
   send, to the host device responsive to storing the data in the portion of the second RAM associated with the host device, a shutdown OK indication.

2. The memory device for claim 1, wherein the data comprises at least one of file system data, meta-data, or a Logical-to-Physical mapping table.

3. The memory device of claim 1, wherein the controller is further operable to:
   utilize the data stored in the portion of the second RAM associated with the host device during a re-initialization of the memory device.

4. The memory device of claim 1, wherein the controller is further operable to:
   receive, from the host device, second data, wherein the second data comprises the data sorted and stored in the portion of the second RAM associated with the host device.

5. The memory device of claim 1, wherein the controller is further operable to copy the data between the RAM and the portion of the second RAM.

6. The memory device of claim 1, further comprising:
   a non-volatile flash memory, wherein the controller is configured to copy the data between the portion of the second RAM and the non-volatile flash memory.

7. The memory device of claim 1, wherein the controller is further operable to:
   deallocate the portion of the second RAM associated with the host device.

8. The memory device of claim 1, wherein the controller is further operable to:
   generate a RAM WRITE command to store the data to the portion of the second RAM; and
   send, via the interface and to the host device, the RAM WRITE command.

9. A method comprising:
   receiving, by a controller of a memory device and from a host device separate from the memory device, a SHUTDOWN command;
   allocating, by the controller and responsive at least in part on the SHUTDOWN command, a portion of random access memory (RAM) associated with the host device;
   receiving, from the host device, an indication of an allocation of the portion of the RAM associated with the host device;
   storing, by the controller and responsive to the SHUTDOWN command, data to the portion of the RAM associated with the host device; and
   sending, to the host device responsive to storing the data in the portion of the RAM associated with the host device, a shutdown OK indication.

10. The method of claim 9, wherein the data comprises at least one of file system data, meta-data, or a Logical-to-Physical mapping table.

11. The method of claim 9, further comprising:
    utilizing, by the controller, the data stored in the portion of the RAM associated with the host device during a re-initialization of the memory device.

12. The method of claim 9, further comprising:
    receiving, by the controller and from the host device, second data, wherein the second data comprises the data sorted and stored in the portion of the RAM associated with the host device.

13. The method of claim 9, further comprising:
    copying, by the controller, the data between the portion of the RAM associated with the host device and a second RAM associated with the controller.

14. The method of claim 9, further comprising:
    deallocating, by the controller, the portion of the RAM associated with the host device.

15. The method of claim 9, further comprising:
    generating, by the controller, a RAM WRITE command to store the data to the portion of the RAM associated with the host device; and
    sending, by the controller and to the host device, the RAM WRITE command.

16. A host device comprising:
    an interface to connect the host device to a memory device separate from the host device;
    a host volatile random access memory (RAM); and
    one or more processors that are operable to:

send, to the memory device, a SHUTDOWN command;

send, to the memory device and via the interface, an indication of an allocated portion of the host volatile RAM;

receive, from the memory device and responsive to the SHUTDOWN command, a command to store data to the allocated portion of the host volatile RAM;

store the data to the allocated portion of the host volatile RAM; and receive, from the memory device and responsive to the SHUTDOWN command, a shutdown OK indication.

17. The host device of claim 16, wherein the one or more processors are further operable to:

cause the memory device to shut down.

18. The memory device of claim 1, wherein the controller is further operable to:

receive, from the host device, a pointer associated with the allocation of the portion of the second RAM.

19. The method of claim 9, further comprising:

receiving, from the host device, a pointer associated with the allocation of the portion of the RAM.

20. The host device of claim 16, wherein the one or more processors are further operable to:

send, to the memory device, a pointer associated with the allocated portion of the host volatile RAM.

* * * * *